(12) United States Patent
Tell (10) Patent No.: US 10,457,499 B2
(45) Date of Patent: Oct. 29, 2019

(54) HANDLING DEVICE WITH SUCTION CUP FOR FOODSTUFF

(71) Applicant: Piab Aktiebolag, Taby (SE)

(72) Inventor: Peter Tell, Taby (SE)

(73) Assignee: Piab Aktiebolag, Taby (SE)

(*) Notice: Subject to any disclaimer, the term of this patent is extended or adjusted under 35 U.S.C. 154(b) by 0 days.

(21) Appl. No.: 15/514,461

(22) PCT Filed: Aug. 21, 2015

(86) PCT No.: PCT/EP2015/069242
§ 371 (c)(1),
(2) Date: Mar. 24, 2017

(87) PCT Pub. No.: WO2016/058737
PCT Pub. Date: Apr. 21, 2016

(65) Prior Publication Data
US 2017/0275104 A1    Sep. 28, 2017

(30) Foreign Application Priority Data
Oct. 13, 2014 (EP) ..................... 1418117

(51) Int. Cl.
*B65G 47/91* (2006.01)
*B66C 1/02* (2006.01)

(52) U.S. Cl.
CPC ............... *B65G 47/91* (2013.01); *B66C 1/02* (2013.01)

(58) Field of Classification Search
CPC ........ B66C 1/02; H01L 21/6838; B65G 47/91
See application file for complete search history.

(56) References Cited

U.S. PATENT DOCUMENTS

| 1,137,767 A | 5/1915 | Leblanc |
| 1,406,145 A | 2/1922 | Blauhorn |

(Continued)

FOREIGN PATENT DOCUMENTS

| BE | 486 879 A | 2/1949 |
| CN | 85109727 A | 7/1986 |

(Continued)

OTHER PUBLICATIONS

GB 1418117.6 filed Oct. 13, 2014 UKIPO Search Report dated Mar. 29, 2015.

(Continued)

*Primary Examiner* — Stephen A Vu
(74) *Attorney, Agent, or Firm* — Rutan & Tucker, LLP (57) ABSTRACT

The present invention relates to handling devices for handling foodstuffs, which may include a suction cup and a docking piece supporting the suction cup. The suction cup may be removably attached to the docking piece. The docking piece may include a drive nozzle inserted into the suction cup, and attached to the docking piece, for ejecting a fluid from the drive nozzle inside of the suction cup. The suction cup may include a drive opening for receiving the drive nozzle of the docking piece, and an outlet nozzle having at least one constriction. The outlet nozzle is aligned with the drive nozzle so that the drive nozzle and the outlet nozzle cooperate to form an ejector. The ejector then applies a suction force to the surface of the foodstuff which is to be handled.

16 Claims, 5 Drawing Sheets

(56) References Cited

U.S. PATENT DOCUMENTS

| | | |
|---|---|---|
| 1,415,406 A | 5/1922 | Leigh |
| 1,491,057 A | 4/1924 | Myers |
| 1,536,180 A | 5/1925 | Buxton et al. |
| 1,902,729 A | 3/1933 | Schmidt |
| 2,011,224 A | 8/1935 | Gustav et al. |
| 2,074,480 A | 3/1937 | Maclean |
| 2,200,800 A | 5/1940 | Miller |
| 2,375,180 A | 5/1945 | Vigo |
| 3,143,401 A | 8/1964 | Lambrecht |
| 3,292,378 A | 12/1966 | Rosenthal et al. |
| 3,371,618 A | 3/1968 | Chambers |
| 3,474,953 A | 10/1969 | Duhaime et al. |
| 3,694,107 A | 9/1972 | Stein |
| 3,838,002 A | 9/1974 | Gluntz et al. |
| 3,881,480 A | 5/1975 | Lafourcade |
| 3,959,864 A | 6/1976 | Tell |
| 3,967,849 A | 7/1976 | Cagle |
| 4,037,991 A | 7/1977 | Taylor |
| 4,158,528 A | 6/1979 | Lasto et al. |
| 4,358,249 A | 11/1982 | Hanson |
| 4,395,202 A | 7/1983 | Tell |
| 4,466,778 A | 8/1984 | Volkmann |
| 4,519,423 A | 5/1985 | Ho et al. |
| 4,634,560 A | 1/1987 | Eckert |
| 4,759,691 A | 7/1988 | Kroupa |
| 4,790,054 A | 12/1988 | Nichols |
| 4,807,814 A | 2/1989 | Douche et al. |
| 4,880,358 A | 11/1989 | Lasto |
| 5,117,871 A | 6/1992 | Gardner et al. |
| 5,190,224 A | 3/1993 | Hamilton |
| 5,205,717 A | 4/1993 | Tell |
| 5,228,839 A | 7/1993 | Peterson et al. |
| 5,374,164 A | 12/1994 | Schulz |
| 5,593,284 A | 1/1997 | Volkmann |
| 5,683,227 A | 11/1997 | Nagai et al. |
| 5,820,353 A | 10/1998 | Beylich et al. |
| 6,017,195 A | 1/2000 | Skaggs |
| 6,209,563 B1 | 4/2001 | Seid et al. |
| 6,394,760 B1 | 5/2002 | Tell |
| 6,582,199 B1 | 6/2003 | Volkmann |
| 6,851,936 B2 | 2/2005 | Stingel et al. |
| 6,877,960 B1 | 4/2005 | Presz, Jr. et al. |
| 6,955,526 B2 | 10/2005 | Yamazaki et al. |
| 6,976,645 B2 | 12/2005 | Ikeda |
| 7,452,191 B2 | 11/2008 | Tell |
| 7,581,374 B1 | 9/2009 | Coffin |
| 10,202,984 B2 | 2/2019 | Tell |
| 2001/0035222 A1 | 11/2001 | Cour |
| 2004/0012197 A1 | 1/2004 | Guillaud et al. |
| 2004/0105760 A1 | 6/2004 | Eisele et al. |
| 2005/0061378 A1 | 3/2005 | Foret |
| 2005/0232783 A1 | 10/2005 | Tell |
| 2006/0217671 A1 | 9/2006 | Peppel |
| 2006/0239831 A1 | 10/2006 | Garris |
| 2006/0284357 A1 | 12/2006 | Goko et al. |
| 2007/0003001 A1 | 1/2007 | Dulka et al. |
| 2007/0132149 A1 | 6/2007 | Hildebrand |
| 2008/0230632 A1 | 9/2008 | Fenton et al. |
| 2008/0260544 A1 | 10/2008 | Tell |
| 2008/0292476 A1 | 11/2008 | Cho |
| 2009/0155668 A1 | 6/2009 | Ban et al. |
| 2009/0209802 A1 | 8/2009 | Francescatti et al. |
| 2009/0259316 A1 | 10/2009 | Ginn et al. |
| 2010/0150743 A1 | 6/2010 | Dellach |
| 2010/0183113 A1 | 7/2010 | Ishida et al. |
| 2011/0042983 A1* | 2/2011 | Yi .................. H01L 21/6838 294/65 |
| 2011/0115243 A1* | 5/2011 | Desai ................ B25J 15/0052 294/65 |
| 2011/0123359 A1 | 5/2011 | Schaaf |
| 2011/0176900 A1* | 7/2011 | Hsieh ................ B25J 15/0616 414/752.1 |
| 2013/0106126 A1* | 5/2013 | Lomerson, Jr. ...... B25J 15/0633 294/188 |
| 2014/0035304 A1* | 2/2014 | Seebauer ............. B66C 1/0293 294/189 |
| 2015/0300377 A1 | 10/2015 | Tell |
| 2015/0308461 A1 | 10/2015 | Tell |
| 2015/0316074 A1 | 11/2015 | Tell |
| 2015/0337866 A1 | 11/2015 | Tell |
| 2017/0122342 A1 | 5/2017 | Tell |

FOREIGN PATENT DOCUMENTS

| | | |
|---|---|---|
| CN | 101124410 A | 2/2008 |
| CN | 101297122 A | 10/2008 |
| CN | 102072209 A | 5/2011 |
| CN | 102654145 A | 9/2012 |
| CN | 103459855 A | 12/2013 |
| DE | 44 25 601 A1 | 1/1996 |
| DE | 195 12 700 A1 | 10/1996 |
| DE | 196 06 020 A1 | 8/1997 |
| DE | 102004034670 B3 | 10/2005 |
| DE | 20 2008 010424 U1 | 12/2009 |
| DE | 10 2009 047083 A1 | 5/2011 |
| EP | 0041055 A1 | 12/1981 |
| EP | 1213485 A2 | 6/2002 |
| EP | 1826160 A1 | 8/2007 |
| EP | 2 333 350 A1 | 6/2011 |
| EP | 2489601 A1 | 8/2012 |
| EP | 2 574 796 A1 | 4/2013 |
| ES | 1079082 U | 4/2013 |
| FR | 2 580 191 A1 | 10/1986 |
| GB | 790 459 A | 2/1958 |
| GB | 1036586 A | 7/1966 |
| GB | 1230070 A | 4/1971 |
| GB | 2257412 A | 1/1993 |
| GB | 2262135 A | 6/1993 |
| GB | 2509182 A | 6/2014 |
| IL | 215423 A | 4/2013 |
| JP | 22973 C | 11/1912 |
| JP | 26748 C | 10/1914 |
| JP | S47-22393 | 6/1972 |
| JP | S48-102496 A | 12/1973 |
| JP | S49-100604 A | 9/1974 |
| JP | S51-042101 A | 4/1976 |
| JP | S56-109989 A | 8/1981 |
| JP | S57-052000 A | 3/1982 |
| JP | S63-144185 U | 9/1988 |
| JP | H04-184000 A | 6/1992 |
| JP | H04-312288 A | 11/1992 |
| JP | H06-502900 A | 3/1994 |
| JP | H07-054800 A | 2/1995 |
| JP | H07-299787 A | 11/1995 |
| JP | H08-229461 A | 9/1996 |
| JP | H08-232900 A | 9/1996 |
| JP | H10-502426 A | 3/1998 |
| JP | H10-291664 A | 11/1998 |
| JP | H11-502915 A | 3/1999 |
| JP | H11-507296 A | 6/1999 |
| JP | 2000-110800 A | 4/2000 |
| JP | 2002-507698 A | 3/2002 |
| JP | 2005-524796 A | 8/2005 |
| JP | 2005282507 A | 10/2005 |
| JP | 2009-513874 A | 4/2009 |
| JP | 2010-030782 A | 2/2010 |
| JP | 2010-168975 A | 8/2010 |
| JP | 2010-276215 A | 12/2010 |
| JP | 2011-058422 A | 3/2011 |
| JP | 2013-248721 A | 12/2013 |
| KR | 2001-0009338 A | 2/2001 |
| WO | 93/03994 A1 | 3/1993 |
| WO | 93/04824 A1 | 3/1993 |
| WO | 96/41685 A1 | 12/1996 |
| WO | 99/49216 A1 | 9/1999 |
| WO | 03/093678 A1 | 11/2003 |
| WO | 2007/050011 A1 | 5/2007 |
| WO | 2009/078797 A1 | 6/2009 |

(56) References Cited

FOREIGN PATENT DOCUMENTS

| WO | 2013/174240 A1 | 11/2013 |
|---|---|---|
| WO | 2014/096023 A1 | 6/2014 |

OTHER PUBLICATIONS

PCT/EP2015/069242 filed Aug. 21, 2015 International Preliminary Report on Patentability dated Jan. 24, 2017.
PCT/EP2015/069242 filed Aug. 21, 2015 International Search Report and Written Opinion dated Jan. 21, 2015.
U.S. Appl. No. 14/648,205, filed May 28, 2015 Non-Final Office Action dated Jan. 25, 2018.
U.S. Appl. No. 14/648,205, filed May 28, 2015 Non-Final Office Action dated Jun. 5, 2017.
U.S. Appl. No. 14/648,224, filed May 28, 2015 Final Office Action dated Jan. 25, 2018.
U.S. Appl. No. 14/648,224, filed May 28, 2015 Non-Final Office Action dated Jun. 5, 2017.
CN 201280078185.7 filed Nov. 2, 2011 Office Action dated Jul. 25, 2016.
CN 201280078224.3 filed Dec. 21, 2012 Office Action dated Jul. 26, 2016.
CN 201280078224.3 filed Dec. 21, 2012 Office Action dated Nov. 9, 2017.
CN 201380060785.5 filed Dec. 18, 2013 Office Action dated Aug. 12, 2016.
CN 201380060787.4 filed Dec. 18, 2013 Office Action dated Nov. 17, 2017.
CN 201380060787.4 filed Nov. 2, 2012 Office Action dated Jun. 29, 2016.
CN 201380067194.0 filed Dec. 18, 2013 Office Action dated Jul. 4, 2016.
EP 15192314.1 filed Oct. 30, 2015 Extended European Search Report dated Apr. 22, 2016.
GB 12234183 Search Report dated Jun. 12, 2013.
GB1223420.9 Search Report dated Jun. 11, 2013.
JP 2015-548229 filed Jun. 19, 2015 Decision of Rejection dated Feb. 5, 2018.
JP 2015-548229 filed Jun. 19, 2015 Office Action dated Aug. 29, 2016.
JP 2015-548234 filed Jun. 19, 2015 Office Action dated Sep. 5, 2016.
JP 2015-548484 filed Jun. 19, 2015 Office Action dated Jun. 19, 2016.
JP 2015-548485 filed Mar. 4, 2015 Office Action dated Jun. 19, 2017.
JP 2015-548486 filed Apr. 17, 2015 Office Action dated May 19, 2017.
PCT/EP2012/076673 filed Dec. 21, 2012 International Search Report dated May 10, 2013.
PCT/EP2012/076749 filed Dec. 21, 2012 International Search Report dated May 13, 2013.
PCT/EP2013/077119 filed Dec. 18, 2013 International Search Report date Mar. 24, 2014.
PCT/EP2013/077121 filed Dec. 18, 2013, International Search Report dated Mar. 25, 2014.
PCT/EP2013/077122 filed Dec. 18, 2013 International Search Report dated Mar. 26, 2014.
U.S. Appl. No. 14/648,245, filed May 28, 2015 Final Office Action dated Mar. 19, 2018.
U.S. Appl. No. 14/648,245, filed May 28, 2015 Non-Final Office Action dated Sep. 22, 2017.
U.S. Appl. No. 14/745,243, filed Jun. 19, 2015 Final Office Action dated Apr. 11, 2018.
U.S. Appl. No. 14/745,243, filed Jun. 19, 2015 Non-Final Office Action dated Sep. 13, 2017.
U.S. Appl. No. 14/745,292, filed Jun. 19, 2015 Non-Final Office Action dated Jan. 26, 2018.
U.S. Appl. No. 14/745,292, filed Jun. 19, 2015 Restriction Requirement dated Aug. 15, 2017.
CN 201610968182.0 filed Oct. 28, 2016 Office Action dated Aug. 24, 2018.
J. Conrad Crow., "Supersonic Nozzle Design", National Advisory Committee for Aeronautics Technical Note No. 1651, Jun. 1948 (Downloadable from https://ntrs.nasa.gov/archive/nasa/casi.ntrs.nasa.gov/19930082268.pdf). Jun. 1948.
JP 2015-548234 filed Jun. 19, 2015 Office Action dated Sep. 14, 2018.
Katano Yoshihi, et al., "Analysis of Supersonic Plug Nozzle Flow", Kyushu University Graduate School Comprehensive Science and Engineering Report, Heisei Jun. 13, vol. 23, No. 1, p. 31-34 (Downloadable from https://catalog.lib.kyushu-u.acjp/opac_download_md/16623/p031.pdf). Jun. 2001.
U.S. Appl. No. 14/648,205, filed May 28, 2015 Advisory Action dated Oct. 16, 2018.
U.S. Appl. No. 14/648,205, filed May 28, 2015 Final Office Action dated Jul. 26, 2018.
U.S. Appl. No. 14/648,205, filed May 28, 2015 Non-Final Office Action dated Nov. 27, 2018.
U.S. Appl. No. 14/648,224, filed May 28, 2015 Notice of Allowance dated Sep. 20, 2018.
U.S. Appl. No. 14/648,245, filed May 28, 2015 Advisory Action dated Jul. 30, 2018.
U.S. Appl. No. 14/745,243, filed Jun. 19, 2015 Final Office Action dated Jul. 27, 2018.
U.S. Appl. No. 14/745,292, filed Jun. 19, 2015 Advisory Action dated Nov. 16, 2018.
U.S. Appl. No. 14/745,292, filed Jun. 19, 2015 Final Office Action dated Sep. 6, 2018.
U.S. Appl. No. 15/293,099, filed Oct. 13, 2016 Non-Final Office Action dated Sep. 24, 2018.
U.S. Appl. No. 14/745,292, filed Jun. 19, 2015 Non-Final Office Action dated Dec. 31, 2018.
U.S. Appl. No. 14/648,205, filed May 28, 2015 Final Office Action dated Apr. 1, 2019.
U.S. Appl. No. 14/745,243, filed Jun. 19, 2015 Non-Final Office Action dated Feb. 11, 2019.
U.S. Appl. No. 15/293,099, filed Oct. 13, 2016 Final Office Action dated Mar. 1, 2019.

* cited by examiner

HANDLING DEVICE WITH SUCTION CUP FOR FOODSTUFF

PRIORITY

This application is a U.S. national stage application of International Patent Application No. PCT/EP2015/069242, filed Aug. 21, 2015, which claims the benefit of priority to Great Britain Patent Application No. 15 192 314.1, filed Oct. 30, 2015, each of which is incorporated by reference in its entirety into this application.

TECHNICAL FIELD

The present invention relates to a suction cup for handling foodstuff, a docking piece configured for supporting a suction cup and a handling device configured for being attached to a handling apparatus for handling foodstuff.

BACKGROUND ART

Vacuum pumps are known which use a source of compressed air or other high-pressure fluid in order to generate a negative pressure or vacuum in a surrounding space, which can be provided as an intake portion of the pump communicating with other parts of the pump or an interface, such as a suction cup, to an object to which the vacuum is to be applied. Compressed air-driven ejectors operate by accelerating the high-pressure air through a drive nozzle and ejecting it as an air jet at high speed across a gap between the drive nozzle and an outlet flow passage or nozzle. A fluid medium in the surrounding space between the drive nozzle and outlet nozzle, e. g. the intake portion, is entrained into the high-speed flow of compressed air, and the jet flow of entrained medium and air originating from the compressed air source is ejected through the outlet nozzle. As the fluid in the space between the drive and outlet nozzles is ejected in this way, a negative pressure or vacuum is created in the volume surrounding the air jet, e.g. in the intake portion, which this fluid or medium previously occupied.

Such vacuum pumps can be provided with a suction cup or a similar device so that the negative pressure or vacuum created by the vacuum pump in the intake portion acts on the inside of the walls of the suction cup, thereby providing for a suction force which can be applied to a surface of an object which thus can be handled. Such a mechanism is generally known to be used for handling small to medium-sized articles, in particular foodstuff such as peppers, tomatoes, sausages, meat in the form of non-processed meat or in the form of hamburger patties, chocolate confectionary, chocolate bars, bread etc. If the foodstuff articles are contacted by the suction cup of a respective handling device, the suction cup is at risk of being contaminated by bacterial growth which not only applies to the contacting area itself, but also for any element downstream of the suction cup, i. e. in particular any outlet nozzle of the vacuum pump. If bacterial growth reaches the contacting area, foodstuff handled by the suction cup may be contaminated.

In order to avoid a health risk due to a possible contamination of parts of the handling device, the suction cup and any downstream element ought to be regularly replaced. This maintenance procedure is both time-consuming and expensive, depending on the number and complexity of the parts to be replaced.

SUMMARY OF THE INVENTION

In view of the above-outlined problems of the prior art, it is an object of the present invention to provide a handling device which allows for maintaining a hygienic operation of a handling device using an ejector and a suction cup for handling foodstuff at a reduced maintenance effort. Accordingly, an object of the invention is providing a handling device using an ejector and a suction cup for handling foodstuff which allows for efficient, in particular quick and cost-efficient, maintenance.

This problem is solved by the suction cup according to embodiments disclosed herein, for example embodiments including the docking piece and the handling device. Preferred further developments and features of the present invention are provided in the following detailed description of the invention.

A suction cup for handling foodstuff according to the present invention comprises a suction opening for applying a suction force to a surface of the foodstuff to be handled, a drive opening for receiving a separate drive nozzle, and an outlet nozzle having at least one constriction which outlet nozzle is aligned with the drive opening, wherein the suction cup is configured for being removably attached to a docking piece for supporting the suction cup.

The suction force applied via the suction opening to the surface of the foodstuff generally results from a negative pressure or vacuum inside of the suction cup. This mechanism as the basis for handling devices using suction cups is generally known in the art, in particular for handling small and medium-sized articles.

The drive opening of the suction cup according to the present invention is a hole, for example a bore, which is sized and shaped for receiving a drive nozzle which drive nozzle is not part of the suction cup, but can separately be inserted into the drive opening and be removed therefrom. The drive opening may comprise means for providing a fluid-tight, in particular an air-tight connection between the periphery of the drive opening and the separate drive nozzle. Alternatively or additionally, the drive nozzle may comprise such means. Means for providing a fluid-tight connection are generally known from the prior art and could be formed by a separate seal, e. g. an o-ring, or by a corresponding shape and appropriate material properties, in particular elasticity, of a contacting surface of the drive nozzle and/or the drive opening.

The outlet nozzle comprises at least one constriction for accelerating the fluid to be led through it. It is possible that the outlet nozzle comprises a single constriction or more than one constriction. Also, it is possible that the outlet nozzle has a stepped cross section with a specific series of relative constrictions along the flow of fluid through the outlet nozzle. In the context of the present invention, a constriction means a portion of a fluid channel relatively having a relatively narrow cross section with regard to adjacent portions of the fluid channel on an upstream and a downstream side of the constriction.

That the suction cup according to the present invention is configured for being removably attached to a docking piece means that it can be attached to the docking piece and removed from it without destroying or damaging it. Preferably, removing the suction cup from the docking piece allows readily replacing the suction cup by a new suction cup to be attached to the docking piece.

The suction cup as described herein forms a possibly contaminated part of a handling device comprising the suction cup and a docking piece.

In other words, the suction cup comprises those elements of the handling device which are located downstream of the source for possible contamination, the surface of the handled foodstuff.

Preferably, the outlet nozzle is integrally formed with the suction cup as a unitary piece.

This reduces manufacturing cost of the suction cup. For example, the suction cup can be formed as one piece by injection molding or similar methods generally known in the art. The outlet nozzle preferably is made of the same material as the remaining portion of the suction cup.

AS an alternative, the suction cup comprising the outlet nozzle can be manufactured using two-component injection molding and can, therefore, be composed of two different materials. Alternatively, it is possible that the outlet nozzle is formed separately and combined with the remaining portion to form the suction cup according to the present invention.

The suction cup preferably is configured such that the drive nozzle, when received in the drive opening, and the outlet nozzle cooperate to form an ejector for providing a suction force to the suction opening.

According to this preferred feature, the drive nozzle and the outlet nozzle directly define a gap between each other across which the fluid, e. g. high-pressure air, entrains fluid, e. g. air, occupying the gap so that a flow of fluid from the gap out of the outlet nozzle is generated which results in a negative pressure in the space surrounding the gap and previously occupied by the fluid. As an alternative, it is possible that the drive nozzle received in the drive opening is configured to guide the high pressure fluid towards a further nozzle which ejects the high pressure fluid across the gap and into the output nozzle. In this exemplary configuration, the drive nozzle and the outlet nozzle would indirectly define the gap required for the function of the ejector.

In a preferred embodiment, the suction cup further comprises a blow-off opening for applying positive pressure to the inside of the suction cup. The blow-off opening is in communication with the suction opening and preferably communicates with a first hole for connecting a pressure source to the blow-off opening.

The provision of a blow-off opening allows for facilitating a releasing operation in which the foodstuff object carried by the suction cup is released from the suction cup. By applying the positive pressure through the blow-off opening, any remaining suction force is overturned so that the foodstuff object is immediately released.

Alternatively, it is possible that no such blow-off opening is provided. In this case, stopping operation of the ejector results in the negative pressure to more slowly equalize so that it may take longer to release the foodstuff object from the suction cup, if compared to applying a positive pressure through a blow-off opening or similar means.

The first hole, with which the blow-off opening preferably communicates, is part of the suction cup and can be configured to receive a post or similar part of a docking piece carrying also the drive nozzle received in the drive opening. In this way, it is easily possible to provide the positive pressure to the blow-off opening without much additional effort, in particular via the docking piece.

Further preferably, the suction cup comprising a vacuum sensor opening, for sensing a pressure level inside of the suction cup, wherein the vacuum sensor opening preferably communicates with a second hole for connecting a vacuum sensor to the vacuum sensor opening.

Providing a vacuum sensor is helpful for several applications generally being known from the prior art. In particular, it is possible to use the vacuum sensor for monitoring a vacuum, and thus a configuration in which a foodstuff object is contacted and being held by the suction opening in order to confirm that proper operation of the suction cup is maintained. Further, a vacuum sensor can be used for controlling a pump or other pressure source for providing high pressure fluid to the drive nozzle in order to operate the ejector.

Also the second hole, with which the vacuum sensor opening preferably communicates, is part of the suction cup and can be configured to receive a post or similar part of a docking piece carrying also the drive nozzle received in the drive opening. In this way, it is easily possible to provide the pressure from inside of the suction cup to a vacuum sensor without much additional effort, in particular via the docking piece.

In a preferred embodiment, the suction cup further comprises a non-return valve placed between the outlet nozzle and the suction opening.

The non-return valve is capable of blocking a fluid flow towards the suction opening and allows a fluid flow from the suction opening towards the outlet nozzle.

The non-return valve, therefore, increases safety of the handling operation because, for example, even when the pressure source is switched off or disconnected from the drive nozzle so that negative pressure is no longer generated, the negative pressure on the suction opening side of the non-return valve can be maintained as a fluid flow towards the suction opening is blocked by the non-return valve.

However, as an alternative, it is possible that no non-return valve is provided which reduces the cost of the suction cup and may slightly increase the suction force which can be applied via the suction opening as the non-return valve between the outlet nozzle and the suction opening consumes some of the suction force for being opened.

According to a further aspect, the present invention lies in a docking piece configured for, on the one hand, supporting a suction cup removably attached to it and, on the other hand, configured for being attached to a handling apparatus for handling foodstuff. The docking piece comprises a drive nozzle which is configured for being inserted into the suction cup attached to the docking piece for ejecting a fluid from the drive nozzle inside of the suction cup, and an interface for functionally connecting the docking piece to the handling apparatus.

The docking piece and the suction cup described before are preferably interrelated products. The docking piece is sized and shaped such that the suction cup can readily be attached to the docking piece and removed therefrom, in particular in order to replace the suction cup by a new suction cup. The ability to exchange only the suction cup without a need to also replace the docking piece comprising the drive nozzle and possibly terminals and peripheral devices allows for reduction of parts as well as a reduction of costs for the parts to be exchanged in order to maintain a hygienic handling of foodstuff using a suction cup. Therefore, the docking piece, as well as the suction cup, allow for efficient, in particular quick and cost-efficient, maintenance of a handling device for handling foodstuff using suction force.

The docking piece configured for being attached to the handling apparatus forms an interface between the handling apparatus and the possibly contaminated part of the handling system. The docking piece is part of the handling device which is not possibly contaminated as its elements are located upstream of the possible source of contamination, the surface of the foodstuff handled by the device. In this function, the docking piece may, for being connected to the handling apparatus, have a common "footprint" for establishing a connection to the robot, traverse or other means supporting and moving the handling apparatus including the docking piece.

Preferably, the docking piece further comprises at least one locking element for providing a mechanically locked connection between the docking piece and the suction cup. Further preferably, the locking element comprises a snap fit element, in particular a projection or a recess, for cooperating with the suction cup, preferably wherein the locking element is provided on a post of the docking piece for engaging a hole in the suction cup.

The preferred locking element ensures a secure mechanical connection between the docking piece and the suction cup. On the other hand, the locking element may facilitate attaching the suction cup to the docking piece as it is, in a preferred embodiment, configured such that it provides a positive feedback to the user as soon as the suction cup is correctly attached to the docking piece. An example for such a locking element is a snap fit element which is configured to snap in when the suction cup is correctly positioned on the docking piece. If the docking piece comprises a post which is configured for engaging a corresponding hole or bore in the suction cup, the locking element can preferably be provided on the post thereby further improving the connection between the suction cup and the docking piece.

In a preferred embodiment, the docking piece further comprises at least one terminal in fluid communication with at least one opening so that, when the suction cup is attached to the docking piece, a fluid communication between the suction cup and the at least one terminal can be established. Further preferably, the at least one terminal is provided with a threading or hose cartridge connector.

The terminal or terminals provided in this preferred embodiment facilitate attaching a vacuum sensor, a pressure source for a blow-off operation or a pressure source for providing the high-pressure fluid to the drive nozzle. In order that a fluid communication is established between the respective terminal and the suction cup, an opening of the docking piece is dimensioned, located and configured to cooperate with a corresponding opening in the suction cup, for example the blow-off opening and the vacuum sensor opening. Alternatively, it is possible that the docking piece is connected to a high-pressure fluid source, a pressure source, a vacuum sensor or any other means using other connection means generally known from the art.

Preferably, the docking piece is predominantly made of stainless steel and, further preferably, the drive nozzle is predominantly made of molded plastic. Stainless steel is preferred because this material is particularly hygienic. Forming the drive nozzle from plastic is preferred over forming it also from stainless steel as precision machining of stainless steel is much more difficult than machining plastic at the same level of precision. For example, the drive nozzle may have an aperture at its tip of a radius of 0.003 mm which is difficult to achieve in stainless steel. It is generally preferred, if the drive nozzle and the docking piece are not integrally formed as a unitary piece, that the drive nozzle is threaded into the docking piece and thus connected to it.

In a preferred embodiment, the docking piece comprises a first post configured for engaging a first hole of the suction cup and a second post configured for engaging a second hole of the suction cup, wherein the first post and the second post comprise an opening in fluid communication with a first terminal and a second terminal, wherein the openings preferably are located at a circumferential position of the first and second post, wherein the first terminal and the second terminal preferably are provided with a threading or hose cartridge connector.

The first and second holes of the suction cup are described further above also in connection with the preferred provision of posts to cooperate with these holes. It is possible that openings such as the blow-off opening or the vacuum sensor opening are provided in the walls of the holes and are sized, located and configured such that one of the openings of the suction cup and a respective one of the openings of the docking piece are in fluid communication. This means that they may overlap or otherwise allow a fluid flow from the one opening to the other opening for example through a channel formed by a groove on the circumference of the respective post and the inner surface of the respective hole. The openings of the posts are in fluid communication with the respective terminals preferably via an internal fluid line inside of and along the extension of the respective post.

In this way, mechanical and functional aspects of a connection between the docking piece and the suction cup are advantageously combined. As an alternative for mainly mechanical connection but also with the option of providing a further function, the posts can be configured as substantially circularly cylindrical rods, but also as dovetail connectors, T-slots or rods of different basic shape such as oval or having the shape of a square, rectangle, triangle or other polygonal form.

A handling device according to the present invention is configured for being attached to a handling apparatus for handling foodstuff. A handling apparatus for handling foodstuff can e. g. be a robot or a traverse and conveying system to which the handling device comprising suction cup and docking piece is applied as some sort of interface between the handling apparatus and the foodstuff to be handled. The docking piece supports the suction cup, whilst the suction cup is removably attached to the docking piece. The docking piece comprises a drive nozzle inserted into the suction cup, which suction cup is attached to the docking piece, so that a fluid ejected from the drive nozzle passes into the suction cup, and an interface for functionally connecting the docking piece to the handling apparatus. On the other hand, the suction cup comprises a drive opening receiving the drive nozzle of the docking piece, an outlet nozzle having at least one constriction, which outlet nozzle is aligned with the drive nozzle, so that the drive nozzle and the outlet nozzle cooperate to form an ejector, and a suction opening for applying a suction force provided by the ejector to a surface of the foodstuff to be handled.

The handling device comprises both a possibly contaminated portion and a not possibly contaminated portion of the handling system. According to the configuration of the handling device comprising a suction cup and a docking piece, the handling device can easily be disassembled by removing and replacing the suction cup so that it is very easy and does not require much effort to carry out all necessary maintenance for maintaining a hygienic condition of the handling device and, thus, the complete handling apparatus over an extended period of time. In other words, it is particularly easy to replace any possibly contaminated parts of the system with new parts without the need to replace also parts of the handling device which are not possibly contaminated from contacting contaminated foodstuff.

Using at least one of a handling device as described above, a suction cup as described above, and a docking piece as described above for handling foodstuff solves the object of the present invention. In particular, it is possible to very efficiently maintain a hygienic condition of the handling apparatus, the handling device and the docking piece by simply replacing the suction cup in regular intervals.

As a conclusion, the inventors found that it is possible to identify possibly contaminated parts of a handling system and to decouple them from other parts thereof. Thus, the possibly contaminated parts can be integrated into a structure which can be readily replaced, preferably as a one-piece structure, and recycled. This way, it is possible to, firstly, carry out maintenance procedures quickly and, secondly, avoid unnecessary costs and waste if compared to an exchange of the whole ejector-suction cup system. Contrary to prior designs with, for instance, a screw-on suction cup, where the designs entailed screwing the suction cup onto something which was a complete pump, i.e. included the drive nozzle and the outlet nozzle, the invention has split the drive nozzle off the remainder of the pump so that the remainder of the pump can selectively, easily and quickly be replaced. Further features and advantages of the present invention become apparent from the following description of the drawings and preferred embodiments and the claims attached.

BRIEF DESCRIPTION OF THE DRAWINGS

FIG. 1a is a bottom view, FIG. 1b is a sectional side view taken along line A-A of FIG. 1a.

FIG. 2a is a top view, FIG. 2b is a sectional side view taken along line C-C of FIG. 2a, FIG. 2c is a perspective view.

FIG. 3a is a bottom view and FIG. 3b is a sectional side view taken along line A-A of FIG. 3a.

DETAILED DESCRIPTION

In the following description, like elements are assigned to like numerals and reference signs and a repetitive description of elements being illustrated in more than one figure is partly omitted.

FIG. 1a illustrates a bottom view of a first embodiment of a handling device 100 comprising a suction cup 10 and a docking piece 30. Details of the suction cup 10 and the docking piece 30 will become further apparent from the following figures and description.

The illustration of the handling device 100 of FIG. 1a illustrates an inside of the suction cup 10 from below, i.e. its open end which is configured for contacting the foodstuff to be handled. Apart from the walls that make up the actual cup, the suction cup 10 comprises an outlet nozzle 16 which is located on an opposite side of the docking piece 30 being attached to the suction cup 10 in an upper region of the suction cup 10. A non-return valve 28 can be seen in FIG. 1a which is located at the top of the actual cup and will be further described in connection with FIGS. 1b and 2 below. In the vicinity of the non-return valve 28, the embodiment according to FIG. 1a comprises two openings 18, 20 which will also be described in further detail below and are, in this embodiment, located on opposing sides of the non-return valve 28 in a radial direction with respect to the substantially circularly shaped bottom of the suction cup 10.

FIG. 1b illustrates a sectional side view of the embodiment of FIG. 1a, taken along the plane indicated as line A-A in FIG. 1a. As to the suction cup 10, FIG. 1b illustrates the outlet nozzle 16 in sectional view. Aligned with the outlet nozzle 16 is a drive opening 14 which is configured for receiving a drive nozzle 32, the drive nozzle 32 being part of the docking piece 30. Between the drive nozzle 32 and an entry of the outlet nozzle 16, the suction cup 10 comprises an intake portion 26, a space surrounding the drive nozzle 32 and the entry of the outlet nozzle 16. Compressed fluid such as air being accelerated and ejected by the drive nozzle 32 and flowing into the outlet nozzle 16 entrains the surrounding fluid in the intake portion 26, thereby generating a negative pressure or vacuum in the intake portion 26. The outlet nozzle 16 illustrated in FIG. 1b comprises a constriction by which the fluid entering the outlet nozzle is accelerated. This constriction is preferably present in the outlet nozzle 16 but is not essential for the present invention. Further, the presence of a constriction is not related or linked to any other feature of the outlet nozzle 16, the drive nozzle 32 or any other member of the mechanism illustrated in FIGS. 1a and 1b. Further, it is possible that the outlet nozzle 16 comprises more than one constriction, for example as a stepped cross section.

Figure 1:
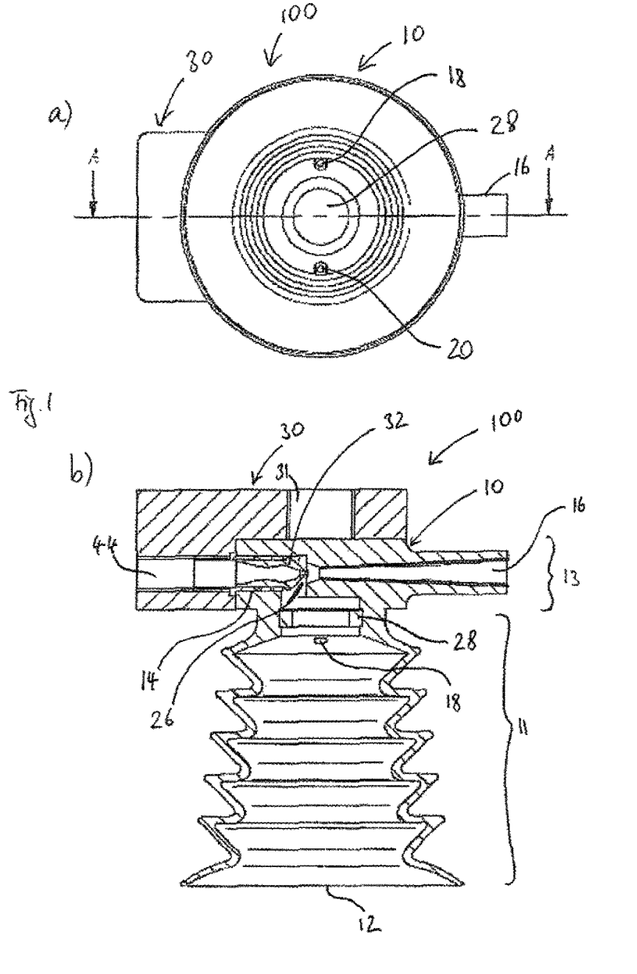
FIG. 1 illustrates a first embodiment of a handling device for handling foodstuff.

Beneath the intake portion 26, the embodiment of FIG. 1 comprises the non-return valve 28 mentioned above with regard to FIG. 1a. On the one hand, the non-return valve 28 allows fluid to flow upwards towards the intake portion 26 driven by the negative pressure or vacuum created in the intake portion 26. The elements of the suction cup 10 above the non-return valve 28, i. e in particular the drive opening 14, the outlet nozzle 16 and the intake portion 26, form an ejector portion 13 of the suction cup 10. If combined with the drive nozzle 32 of the docking piece 30, the ejector portion 13 provides an ejector so that a vacuum can be generated. On the other hand, the non-return valve 28 allows for preventing fluid from flowing from the intake portion 26, the outlet nozzle 16, the inlet opening 14 or drive nozzle 32 towards the suction opening 12. In this way, the vacuum and, therefore, the suction force within the bellows portion 11 acting on the surface of the foodstuff contacting the suction opening 12, can be maintained even when the pressurized fluid is no longer applied to the drive nozzle.

Beneath the non-return valve 28, the suction cup 10 comprises a bellows portion 11 which is substantially formed by a bellows-shaped, generally tapered surrounding wall extending from near the position of the non-return valve 28 to a suction opening 12 at the bottom part of the suction cup 10. The suction opening 12 is configured for contacting foodstuff to be handled by the handling device 100. If the surface of foodstuff to be handled by the handling device 100 is properly contacted by the suction opening 12, the vacuum generated in the intake portion 26 will result in the generation of a vacuum of similar strength within the bellows portion 11, thereby generating a suction force which acts on the foodstuff the surface of which being contacted by the suction opening 12.

The high-pressure fluid which is provided to the drive nozzle 32 of the docking piece 30 is led to the drive nozzle 32 via a pressure line, bore, hole, in the connecting piece 30 ending in a terminal 44 for attaching a pressure source, such as a pump or a pressurized fluid source, or a pressure line connecting the terminal 44 to a pressure source.

In the upper part of the docking piece 30, a hole 31 is provided which corresponds to a supporting structure for the docking piece 30 in this example. Via this supporting structure, the docking piece 30 can be attached to a supporting structure such as a robot arm or a traverse.

Of course, it is possible that the docking piece 30 has different means for it to be coupled or connected to a supporting device.

FIG. 2a illustrates a top view of an example of a non-return valve 28 used in the embodiment of FIG. 1 above. The non-return valve 28 comprises a flap which can be bent in one direction but cannot be bent into the opposite direction. FIG. 2b illustrates a sectional view of the non-return valve 28 taken along the plane illustrated as line C-C in FIG. 2a. Further, FIG. 2c illustrates a perspective view of the non-return valve 28.

Figure 2:
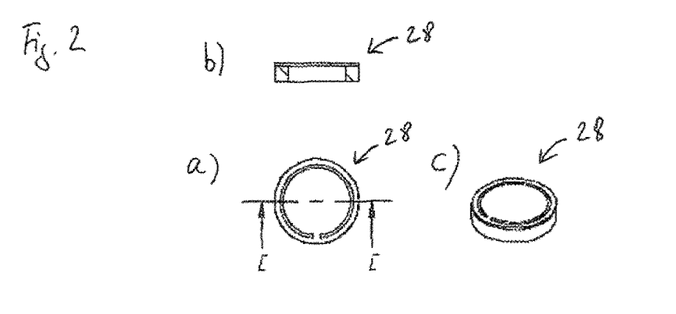
FIG. 2 illustrates an embodiment of a non-return valve used in the embodiment according to FIG. 1.
Figure 3:
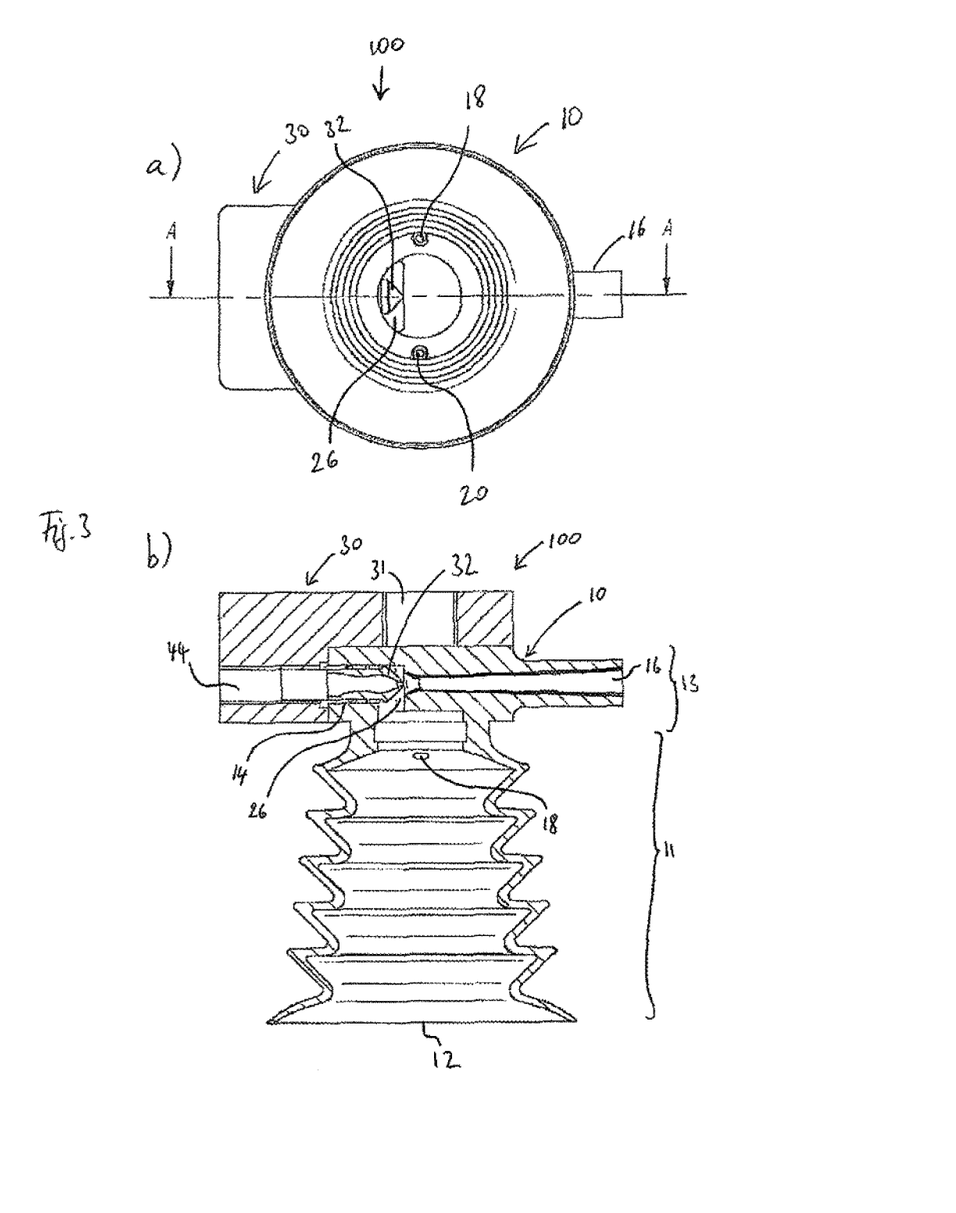
FIG. 3 illustrates a further embodiment of a handling device for handling foodstuff.

FIG. 3 shows a further embodiment of a handling device 100. The embodiment of FIG. 3 is similar to the embodiment of FIG. 1. The embodiment of FIG. 3 differs from the embodiment of FIG. 1 in that it does not comprise the non-return valve 28 illustrated in FIGS. 1 and 2.

In the embodiment of FIG. 3, without the non-return valve 28 of FIGS. 1 and 2, any negative pressure within the bellows portion 11 will be equalized as soon as the high-pressure fluid flow through the drive nozzle 32 and the outlet nozzle 16 is stopped, unless additional valves are provided at applicable positions along the stream of fluid.

On the other hand, the non-return valve 28 of the embodiment illustrated in FIG. 1 slightly reduces the negative pressure in the bellows portion and, further, is an additional part which results in additional cost of the suction cup 10. If compared to the embodiment according to FIG. 1, the embodiment according to FIG. 3 maximizes the suction force at the suction opening 12 and reduces the cost for the suction cup 10 at the expense of losing the ability to maintain the vacuum inside of the bellows portion 11, in the absence of any additional means, if the ejector is not operated.

Figure 4:
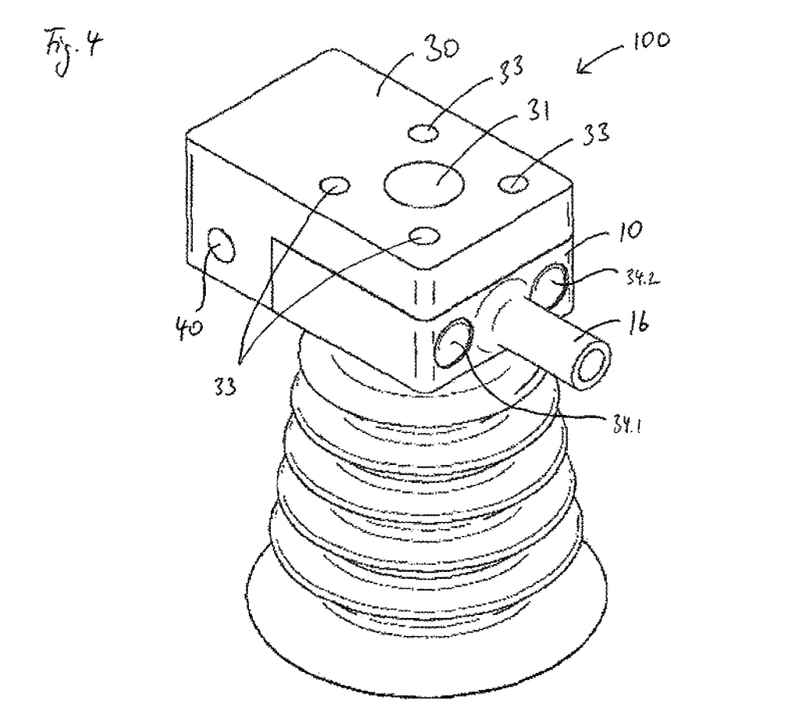
FIG. 4 illustrates a perspective view of an embodiment of a handling device.

FIG. 4 illustrates a perspective view of a handling device 100 comprising the suction cup 10 and the docking piece 30 described above. In addition to the illustrations of FIGS. 1 and 3, FIG. 4 illustrates that the docking piece 30 is locked to the suction cup 10 by means of two posts 34.1, 34.2 which will be described in more detail further below. Also, FIG. 4 illustrates a further terminal 40 which is in fluid communication with the opening 18 illustrated in FIGS. 1 and 3 and which will also be further described below in more detail.

The docking piece 30 illustrated in FIG. 4 comprises, in addition to the hole 31, four further holes 33 which are located in a square configuration around the hole 31. The five holes 31, 33 provide for attaching the docking piece 30 to a support member, e. g. of a robot or traverse, for holding the handling device 100. Of course, different means for supporting the docking piece 30 will be apparent to the skilled person. The means for supporting the docking piece 30 are not related to the handling device 100 or any part thereof.

Figure 5:
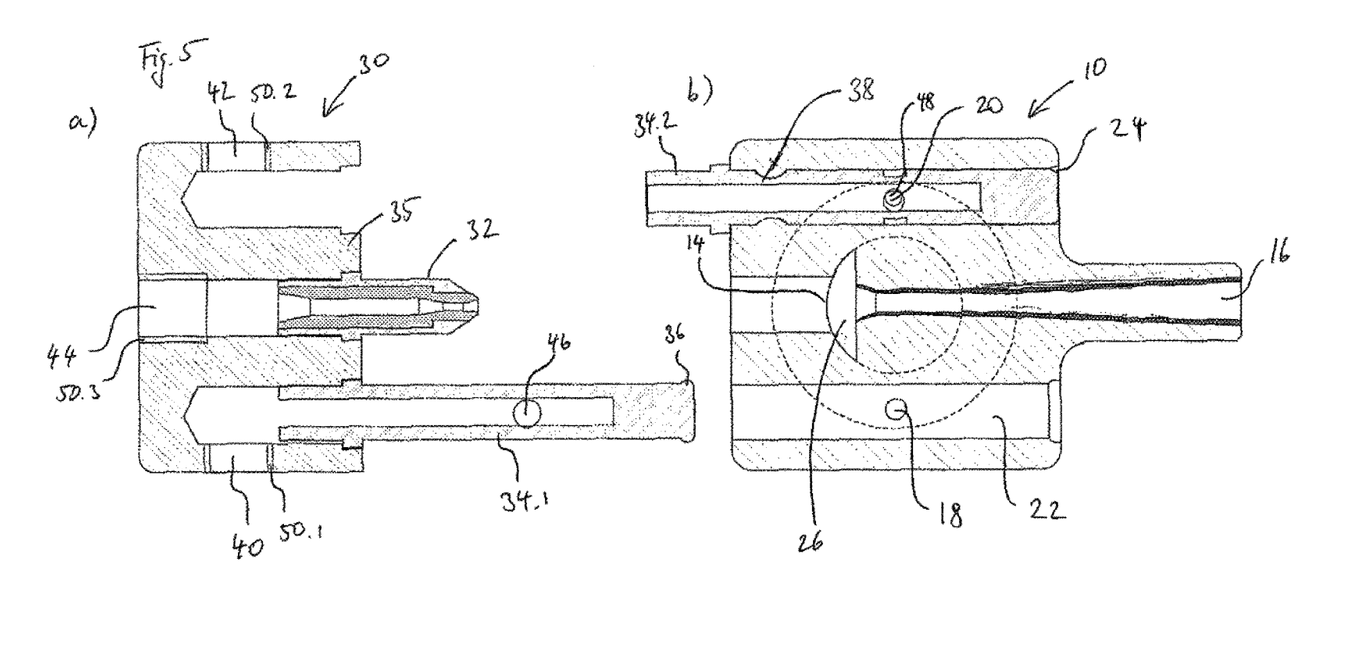
FIG. 5 illustrates a sectional view of an embodiment of elements of a handling device.

FIG. 5 illustrates a sectional top view of a suction cup 10 and a docking piece 30, respectively.

In the left hand part of FIG. 5, the docking piece 30 is illustrated to comprise the drive nozzle 32 as a separate piece which is attached to a body 35 of the docking piece 30. The body 35 is preferably made of stainless steel, whereas the drive nozzle 32 is preferably made of plastic. The body 35 and the drive nozzle 32 being "made of" a certain material means that these elements are predominantly made of the respective material. This also covers that relatively small parts or separate elements such as an o-ring or seal, an inlay or coating can be formed of a different material such as a different metal, plastic or rubber.

The drive nozzle 32 is in fluid communication with the terminal 44 to which a high-pressure fluid source can be connected, for example via a pressure line or similar means. In order to securely attach the high-pressure fluid source to the docking piece 30, the terminal 44 comprises a threading 50.3. Alternatively, a hose cartridge connector can be used for the terminal 44.

A similar or same threading as the threading 50.3 is provided at the further terminal 40 as threading 50.1 and a further terminal 42 as further threading 50.2. Also for these terminals 40 and 42, a hose cartridge connector can be used as an alternative to the threading 50.1, 50.2. The further terminals 40, 42 in the body 35 of the docking piece 30 provide for a fluid communication to an inside of posts 34.1, 34.2 which posts respectively comprise an opening 46, 48. The openings 46, 48 are located and dimensioned such that they can cooperate with a respective opening 18, 20 in the suction cup 10, as will be described in more detail further below. In this way, the terminals 40, 42 are in fluid communication with the suction cup 10, in particular an inside of the bellows portion 11 of the suction cup 10.

The posts 34.1, 34.2 of the docking piece 30 can be made of stainless steel as the body 35 of the docking piece 30, or of a different material such as molded plastic. The posts 34.1, 34.2 are preferably provided with a locking element 36, 38 which locking element is configured to engage with a portion of the suction cup 10 in order to removably lock the suction cup 10 to the docking piece 30. The left hand part of FIG. 5, FIG. 5a, illustrates a first possible realization of the post 34.1 and locking element 36, wherein the locking element 36 is realized by a circumferential projection at the end of the post 34.1. The locking element 36 is located and sized to engage with a corresponding recess in the suction cup 10. Accordingly, when the suction cup 10 is attached to the docking piece 30, the locking element 36 provides for an increased resistance avoiding that the suction cup 10 can accidentally be removed from the docking piece 30.

Purposely removing the suction cup 10 from the docking piece 30 is, however, possible, preferably even manually and without using complex tools.

An alternative post 34.2 illustrated on the right hand side of FIG. 5, FIG. 5b, uses a different realization of a locking element 38. The locking element 38 on the post 34.2 comprises a recess which is configured and sized to engage with a respective projection of the suction cup 10. The illustrations of the posts 34.1, 34.2 and the respective locking elements 36, 38 are meant as an exemplary illustration of possible ways to securely attach the suction cup 10 to the docking piece 30.

Of course, the skilled person will readily appreciate further possible realizations of a reliable attachment of the suction cup 10 to the docking piece 30 including a mechanism for locking or latching the suction cup 10 to the docking piece 30.

As is illustrated in FIG. 5b, the suction cup 10 comprises two bores 22, 24 which are dimensioned and configured to receive at least partially the posts 34.1, 34.2, respectively. The bores 22, 24 extend parallel to each other and to the drive opening 14 and the outlet nozzle 16 of the suction cup 10. Preferably, the bores 22, 24 are located on two opposing sides with regard to the drive nozzle 32, drive opening 14 and outlet nozzle 16. This configuration provides for a particularly tight and secure connection between the docking piece 30 and the suction cup 10. However, it is of course possible to use different means for securely attaching the suction cup 10 to the docking piece 30 so that the suction cup 10 can be supported by the docking piece 30. For example, it is possible to modify the drive nozzle 32 and the drive opening 14, respectively, so that the drive nozzle 32 can provide for a locking element in addition to its function of generating the negative pressure within the intake portion 26 and, thereby, generating the suction force at the suction opening 12.

The openings 18, 20 in the suction cup 10, if substantially aligned with the openings 46, 48 in the posts 34.1, 34.2 provide for a fluid communication between the inside of the suction cup 10 and, via the openings 46, 48 and an inside of the posts 34.1, 34.2, the terminals 40, 42.

This fluid communication can be used for applying a positive pressure to the inside of the suction cup 10, thereby facilitating and expediting releasing of the foodstuff handled by the handling device 100 from the suction opening 12. Releasing an object that is properly contacted by the suction opening 12 is not always achieved easily, even after stopping the vacuum source, i. e. the operation of the ejector. In order to facilitate the separation and, therefore, in order to increase the possible handling speed, a positive pressure can be applied to the inside of the suction cup 10 overcoming any suction force so that the foodstuff is easily and quickly released from the suction cup 10.

Alternatively or additionally, one or both of the openings 18, 20 can be used for sensing the positive or negative pressure inside of the bellows portion 11 of the suction cup 10. The fluid communication between the inside of the suction cup 10 and the terminals 40, 42 allows for attaching a pressure sensor to one of these terminals 40, 42, or a pressure line connected thereto, which facilitates monitoring the operation of the handling device 100. In particular, it can be monitored whether a negative pressure exists inside of the suction cup 10 which would mean that the suction cup 10 applies a suction force to an object. If the pressure inside of the suction cup 10 is equal to the ambient pressure, the suction cup 10 applies no suction force to any object. Further, providing a pressure sensor allows for easily controlling an ejector or other parts of the handling device 100.

Figure 6:
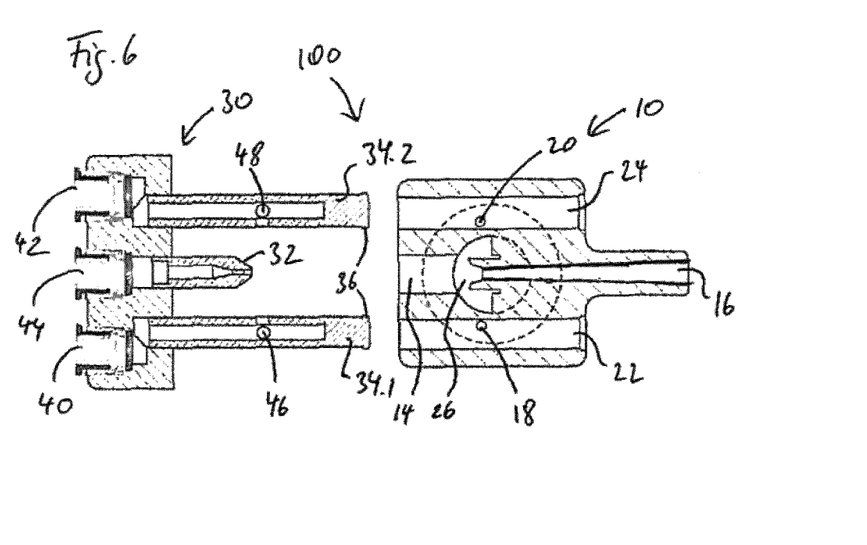
FIG. 6 illustrates a sectional view of a further embodiment of elements of a handling device.

FIG. 6 illustrates a slightly different embodiment of a handling device 100 in a similar illustration as FIG. 5. In contrast to the embodiment of FIG. 5, the terminals 40, 42, 44 of the docking piece 30 of FIG. 6 are provided in a different way. Further, also post 34.2 is configured in accordance with the configuration of the post 34.1 in FIG. 5. Accordingly, both posts 34.1, 34.2 comprise a projection on their ends as the locking element 36.

Figure 7:
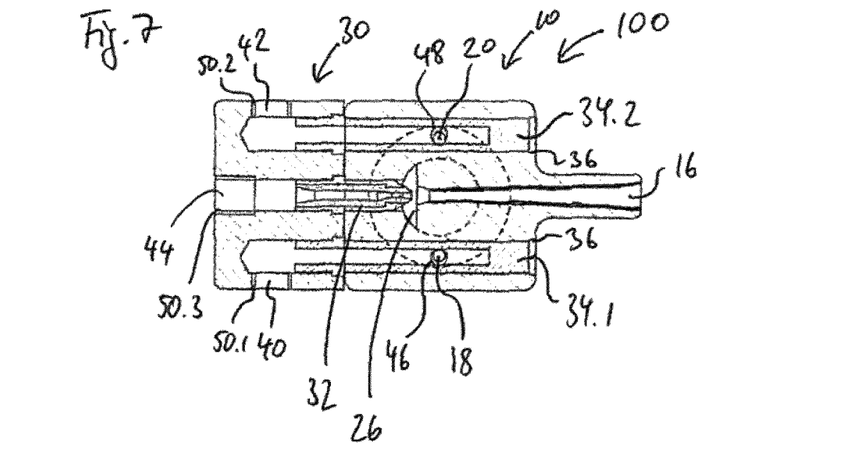
FIG. 7 illustrates in a sectional view a further embodiment of elements of a handling device.

FIG. 7 illustrates a further embodiment in a similar view as FIGS. 5 and 6. In contrast to the embodiment of FIG. 6, the terminals 40, 42, 44 of FIG. 7 are similar to the terminals of FIG. 5 and both posts 34.1, 34.2 are configured in the way as illustrated in FIG. 6, i. e. with a projection 36 as the locking element for securely attaching the suction cup 10 to the docking piece 30.

In the illustrated embodiments, a unitary piece is provided as the suction cup 10 that comprises a conventional suction cup, i.e. the bellows portion 11, and an outlet nozzle 16 of an ejector as well as an intake portion 26. Accordingly, this unitary piece-suction cup 10 can be replaced without the need to replace additional parts of the ejector. The suction cup 10 according to the illustrated embodiments comprises not only the bellows portion 11 but also the ejector portion 13 comprising those elements of the ejector which are, with respect to the fluid flow necessary for handling foodstuff, located downstream of the contact area, i. e. the suction opening 12. This means that any part of the handling device 100 downstream of any possible contamination resulting from contact with contaminated foodstuff can easily be replaced in regular intervals in order to maintain a hygienic operation of the system. At the same time, the invention avoids cost and time required for replacing other parts of the device such as the drive nozzle 32 or further upstream elements of the ejector or its periphery.

In an alternative embodiment, it is possible that also the drive nozzle 32 is integrally formed with the suction cup 10. Such a configuration can be achieved as a unitary piece or as a combination of the drive nozzle 32, on the one hand, and the unitary piece of suction cup 10 comprising the outlet nozzle 16, on the other hand. In the latter case, the drive nozzle 32 may be securely attached to the suction cup 10. In this case, it is preferable that the docking piece 30 provides for a terminal or interface for tightly and mechanically securely connecting the docking piece 30 and the suction cup 10.

Further, the above illustrated embodiments disclose the suction cup 10 to have three bores, openings or holes, of substantially cylindrical shape. One of the bores is used as the drive opening 14, whereas two further bores 22, 24 are used for receiving respective posts 34.1, 34.2 of the docking piece 30. However, it is of course possible that a different geometric configuration is chosen for fluid-tight connection between the docking piece 30 comprising the drive nozzle 32 and possibly posts 34.1, 34.2 and the suction cup 10.

As described above, one of the openings 18, 20 of the suction cup 10, when cooperating with the openings 46, 48 and terminals 40, 42 of the docking piece 30, can be used to provide a blow-off function for facilitating a release operation of foodstuff carried by the suction cup 10, or for a pressure sensor for monitoring the pressure inside of the suction cup 10, in particular the bellows portion 11. However, it is of course possible that these optional features are omitted. With particular regard to monitoring the suction force applied by the suction opening 12, it is possible to use a camera, optical sensor or other means instead of a pressure sensor. Also, it is possible to use only a single opening 18, 20 for providing both functions mentioned before. For example, a single opening 18, 20 may be in fluid communication with a T-section, where the fluid line branches into two fluid lines, one for a pressure sensor and the other one for a fluid pressure source used for the blow-off function.

As mentioned before, it is preferred that the connections of the terminals 40, 42, 44 are provided with a threading. However, it is, of course, possible to use a hose cartridge connector or similar means.

In the above-illustrated embodiments, substantially cylindrical posts 34.1, 34.2 are used for both providing a mechanical connection between the docking piece 30 and the suction cup 10 and for providing a fluid line between the openings 18, 20 and the terminals 40, 42. Of course, in the absence of the optional openings 18, 20, it is possible that these posts exclusively serve as mechanical connections. As an alternative to using cylindrical posts, other mechanical connections known to a person skilled in the art are possible, for example T-slots, dovetail connectors, non-circular posts etc., wherein it is particularly preferred that a quick replacement of the suction cup 10 without removing the docking piece 30 is possible.

By using the present invention, it is possible to quickly replace only those parts of a vacuum handling device which are possibly contaminated after having contacted foodstuff. Parts of the ejector and handling device which are upstream or isolated with regard to the foodstuff and any possible bacterial or other contamination are not required to be replaced at the same interval so that the present invention allows for significantly increasing the efficiency of the complete handling device.

All patents, patent applications, and publications referred to herein are incorporated by reference in their entirety as if each individual patent, patent application, or publication were specifically and individually set forth herein.

The invention claimed is:

1. A suction cup for handling foodstuff, comprising:
a suction opening for applying a suction force to a surface of the foodstuff to be handled,
a drive opening for receiving a separate drive nozzle, and
an outlet nozzle integrally formed with the suction cup as a unitary piece and having at least one constriction, wherein the outlet nozzle is aligned with the drive opening, and wherein the suction cup is configured for being removably attached to a docking piece for supporting the suction cup,
the suction cup being configured such that the drive nozzle, when received in the drive opening, and the outlet nozzle cooperate to form an ejector for providing a suction force to the suction opening.

2. The suction cup according to claim 1, further comprising a blow-off opening, for applying positive pressure to an inside of the suction cup, which blow-off opening is in communication with the suction opening, wherein the blow-off opening preferably communicates with a first hole for connecting a pressure source to the blow-off opening.

3. The suction cup according to claim 1, further comprising a vacuum sensor opening, for sensing a pressure level inside of the suction cup, wherein the vacuum sensor opening preferably communicates with a second hole for connecting a vacuum sensor to the vacuum sensor opening.

4. The suction cup according to claim 1, further comprising a non-return valve placed between the outlet nozzle and the suction opening, the non-return valve being capable of blocking a fluid flow towards the suction opening and allowing a fluid flow from the suction opening towards the outlet nozzle.

5. A docking piece configured for supporting a suction cup removably attached thereto and configured for being attached to a handling apparatus for handling foodstuff, the docking piece comprising:
a drive nozzle which is configured for being inserted into the suction cup attached to the docking piece for ejecting a fluid from the drive nozzle inside of the suction cup, and
an interface for functionally connecting the docking piece to the handling apparatus, further comprising at least one locking element for providing a mechanically locked connection between the docking piece and the suction cup,
wherein the at least one locking element comprises a snap fit element for cooperating with the suction cup, and
wherein the at least one locking element is provided on a post of the docking piece for engaging a hole in the suction cup.

6. The docking piece of claim 5, wherein the snap fit element is a projection or a recess.

7. The docking piece of claim 5, further comprising at least one terminal in fluid communication with at least one opening so that, when the suction cup is attached to the docking piece, a fluid communication between the suction cup and the at least one terminal can be established, preferably wherein the at least one terminal is provided with a threading or hose cartridge connector.

8. The docking piece of claim 5, wherein the docking piece is predominantly made of stainless steel, and wherein the drive nozzle is predominantly made of molded plastic.

9. The docking piece of claim 5, further comprising a first post configured for engaging a first hole of the suction cup and a second post configured for engaging a second hole of the suction cup, wherein:
each of the first post and the second post comprise an opening in fluid communication with a first terminal and a second terminal,
the opening of the first post and the opening of the second post are located at a circumferential position of the first post and the second post, and
the first terminal and the second terminal are provided with a threading or hose cartridge connector.

10. A handling device configured for being attached to a handling apparatus for handling foodstuff, comprising a suction cup and a docking piece supporting the suction cup, wherein the suction cup is removably attached to the docking piece, wherein the docking piece comprises:
a drive nozzle inserted into the suction cup, the suction cup being attached to the docking piece so that fluid ejected from the drive nozzle passes into the suction cup, and
an interface for functionally connecting the docking piece to the handling apparatus, and
wherein the suction cup comprises
a drive opening receiving the drive nozzle of the docking piece,
an outlet nozzle having at least one constriction in which the outlet nozzle is aligned with the drive nozzle, so that the drive nozzle and the outlet nozzle cooperate to form an ejector, and
a suction opening for applying a suction force provided by the ejector to a surface of the foodstuff to be handled.

11. The handling device of claim 10, wherein the suction cup is a suction cup according to claim 1.

12. The handling device according to claim 10, wherein the docking piece comprises at least one terminal in fluid communication with an inside of the suction cup.

13. An assembly, comprising:
a suction cup for handling foodstuff, comprising:
a suction opening designed to apply a suction force to a surface of the foodstuff;
a drive opening designed to receive a drive nozzle; and
an outlet nozzle integrally formed with the suction cup as a unitary piece, the outlet nozzle having at least one constriction and being aligned with the drive opening; and
a docking piece configured for supporting the suction cup, the suction cup designed to be removably attached to the docking piece, the docking piece designed to be attached to a handling apparatus, the docking piece comprising:
a drive nozzle designed for insertion into the suction cup attached to the docking piece and for ejecting a fluid from the drive nozzle; and
an interface designed to functionally connect the docking piece to the handling apparatus, the interface comprising at least one locking element designed to provide a mechanically locked connection between the docking piece and the suction cup, wherein the at least one locking element comprises a snap fit element for cooperating with the suction cup, and wherein the at least one locking element is provided on a post of the docking piece for engaging a hole in the suction cup.

14. A suction cup for handling foodstuff, comprising:
a suction opening for applying a suction force to a surface of the foodstuff to be handled;
a drive opening for receiving a separate drive nozzle;
an outlet nozzle integrally formed with the suction cup as a unitary piece and having at least one constriction, wherein the outlet nozzle is aligned with the drive opening, and wherein the suction cup is configured for being removably attached to a docking piece for supporting the suction cup; and
a blow-off opening for applying positive pressure to an inside of the suction cup, the blow-off opening in communication with the suction opening, wherein the blow-off opening preferably communicates with a first hole for connecting a pressure source to the blow-off opening.

15. A suction cup for handling foodstuff, comprising:
a suction opening for applying a suction force to a surface of the foodstuff to be handled;
a drive opening for receiving a separate drive nozzle;
an outlet nozzle integrally formed with the suction cup as a unitary piece and having at least one constriction, wherein the outlet nozzle is aligned with the drive opening, and wherein the suction cup is configured for being removably attached to a docking piece for supporting the suction cup; and
a vacuum sensor opening for sensing a pressure level inside of the suction cup, wherein the vacuum sensor opening preferably communicates with a second hole for connecting a vacuum sensor to the vacuum sensor opening.

16. A suction cup for handling foodstuff, comprising:
a suction opening for applying a suction force to a surface of the foodstuff to be handled;
a drive opening for receiving a separate drive nozzle;
an outlet nozzle integrally formed with the suction cup as a unitary piece and having at least one constriction, wherein the outlet nozzle is aligned with the drive opening, and wherein the suction cup is configured for being removably attached to a docking piece for supporting the suction cup; and
a non-return valve placed between the outlet nozzle and the suction opening, the non-return valve being capable of blocking a fluid flow towards the suction opening and allowing a fluid flow from the suction opening towards the outlet nozzle.

\* \* \* \* \*